Figure 1:
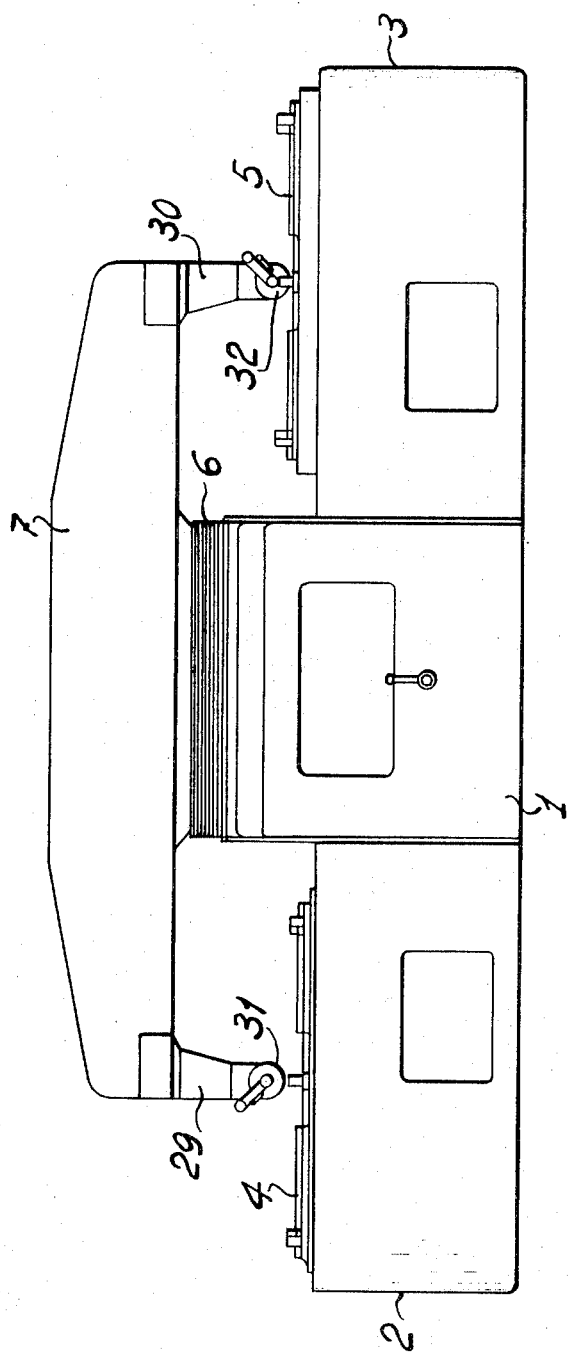

United States Patent
Pasquale

[15] 3,657,961
[45] Apr. 25, 1972

[54] FOUR-AXIS MILLING MACHINE FOR PRODUCING EQUAL OR SYMMETRICAL PIECES, SUCH AS MOLDS

[72] Inventor: Donato Pasquale, Milan, Italy
[73] Assignee: Industrie Pirelli S.p.A.
[22] Filed: Sept. 15, 1969
[21] Appl. No.: 857,942

[30] Foreign Application Priority Data

Sept. 25, 1968   Italy..............................21,634 A/68

[52] U.S. Cl. .....................................90/11 R, 90/14, 90/15, 90/17, 90/13 C, 90/20
[51] Int. Cl. .........................................................B23c 3/04
[58] Field of Search................90/16, 17, 20, 13.99, 15, 11, 90/14, 15; 77/3

[56] References Cited

UNITED STATES PATENTS

| | | |
|---|---|---|
| 2,750,851 | 6/1956 | Berthiez.................................90/17 |
| 3,175,190 | 3/1965 | Gasser................................90/13.99 |
| R26,393 | 5/1968 | Daugherty...............................90/11 |

*Primary Examiner*—Gil Weidenfeld
*Attorney*—Stevens, Davis, Miller & Mosher

[57] ABSTRACT

This invention relates to a milling machine for working on the inner surfaces of work pieces such as molds chills, patterns and the like which has one or more platforms adapted to carry the piece and which is rotatable about an axis or slidable in a plane. The platform is carried by a frame which in turn carries a vertically movable slide. The latter supports another slide which is horizontally movable. Horizontal axis supports are mounted on the second slide and a ledger is mounted on the supports. Tools are so mounted on the ends of the ledger that their respective tips are aligned with the horizontal swinging axis of the ledger. The machine is adapted to carry out four movements in different directions.

8 Claims, 8 Drawing Figures

INVENTOR
DONATO PASQUALE

INVENTOR
DONATO PASQUALE

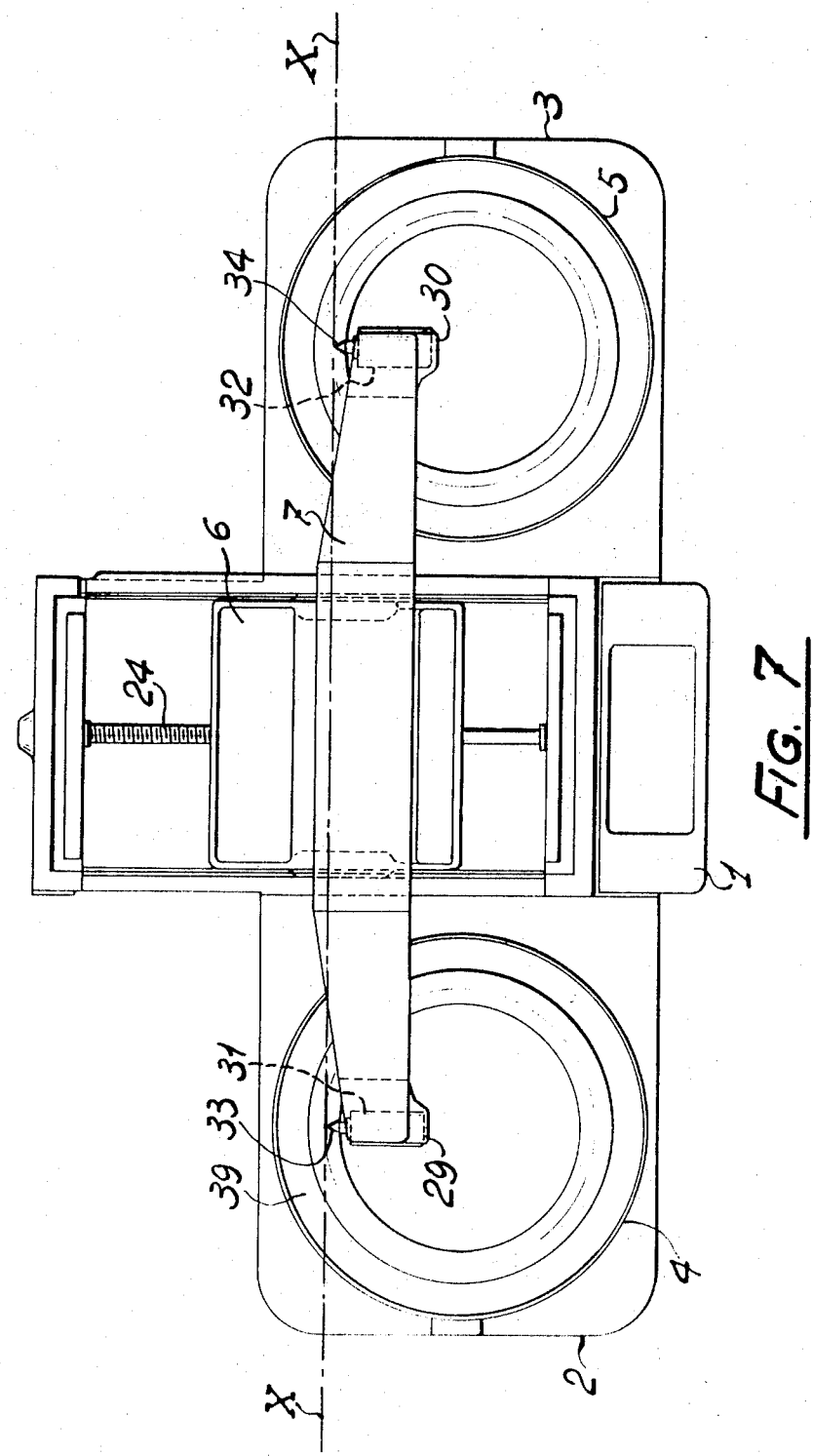

FOUR-AXIS MILLING MACHINE FOR PRODUCING EQUAL OR SYMMETRICAL PIECES, SUCH AS MOLDS

An object of the present invention is the provision of a milling machine in which the tools for working on the pieces are mounted on a support swinging about an axis passing through the tip of the tools. Four relative movements between the mill axis and the pieces to be worked are available. Such movements are the rotation of the work piece about a vertical axis, or the translation of the same in a horizontal plane, the swivel movement of the mill axis in a vertical plane, and the horizontal and vertical translation of the same axis.

Briefly summarized, the milling machine comprises at least one piece-carrying platform rotatable about a vertical axis or horizontally slidable along a pre-established direction. Preferably this machine has two platforms, symmetrical with respect to the spindles support, and connected to the latter by means of a fixed frame. The spindles support comprises a slide for vertical movement and a second slide for horizontal movement, and a ledger, or rocking cross-head, swinging about a horizontal axis extending in a direction perpendicular to the direction of said horizontal movement of the milling machine. The spindle supporting arms, together with the relative motors for the working movement of the machine are mounted on the ends of the ledger.

In order to work two equal or symmetrical pieces at the same time, the machine is provided with two piece-carrying platforms, which can rotate in the same or in opposite sense, or with two-piece carrying platforms, which are aligned and effect the same or an opposite sliding movement in a direction transversely to the above indicated horizontal movement of the mill.

Moreover, one of said pairs of platforms may be adjusted for a vertical pre-established stroke in order to compensate for possible differences in the thickness of the pieces to be worked, which seat on and are retained on said platforms.

In this way it is possible to obtain the two halves of a mold, which are equal or symmetrical, as in the case of a mold for vehicle tires, which require the milling of grooves, and which develop along various paths on revolution surfaces and of recesses, the sides of which can have different inclinations, variable with respect to the bottom surface even in the same recess.

The swinging ledger, for space reasons, can preferably carry out an oscillation of approximately ±45° about the horizontal axis, and the spindle-supporting arms can be of two types, interchangeable and easily replaceable, the one able to show the axis of the mill in vertical position, and the other in horizontal position, when the ledger lies in a vertical trued up position, in order to provide two ranges of action, one of horizontal central axis and the other of vertical central axis, bordering on one another along a straight line at 45°, so that it is possible to operate along an arc of 180°.

As the swinging axis of the ledger passes through the tip of the tools, the portion of straight line constituting the axis of the mill can move with the end which forms its tip along the horizontal or vertical orthogonal coordinates, and with the other end along a radial vertical plane passing through the axis of the mold or in any event on a vertical plane parallel to the direction of the horizontal movement of the tools.

According to the invention, the control of the movements of the mill axis relative to the material to be worked is carried out by numerical control program systems, of the punched or magnetic tape type and the like, and also by means of a template reproducer and/or a combination of such systems.

Preferably, one of these movements is controlled to follow the profile of a template representing the base or reference surface, as for instance the outer profile of a tire.

Figure 2:
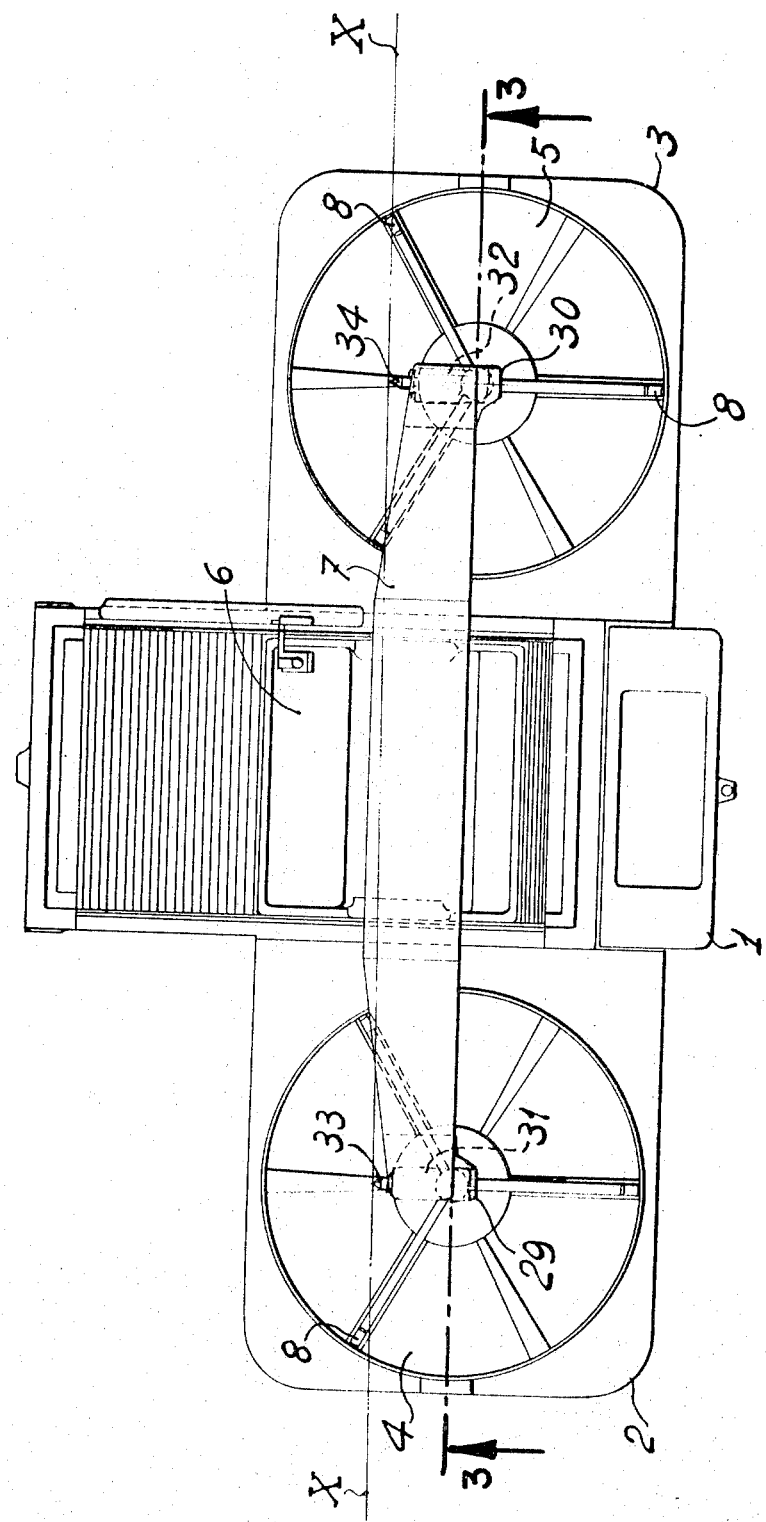
Figure 3:
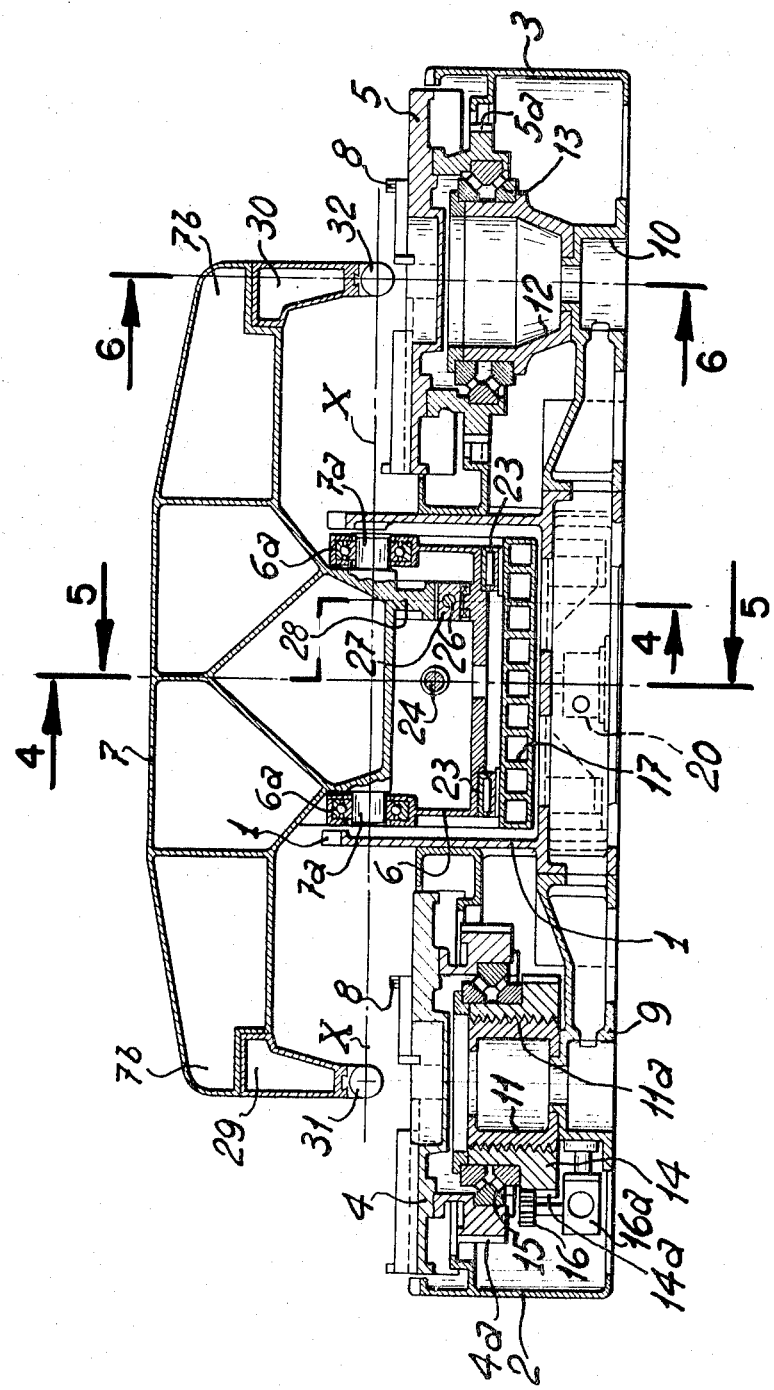
Figure 4:
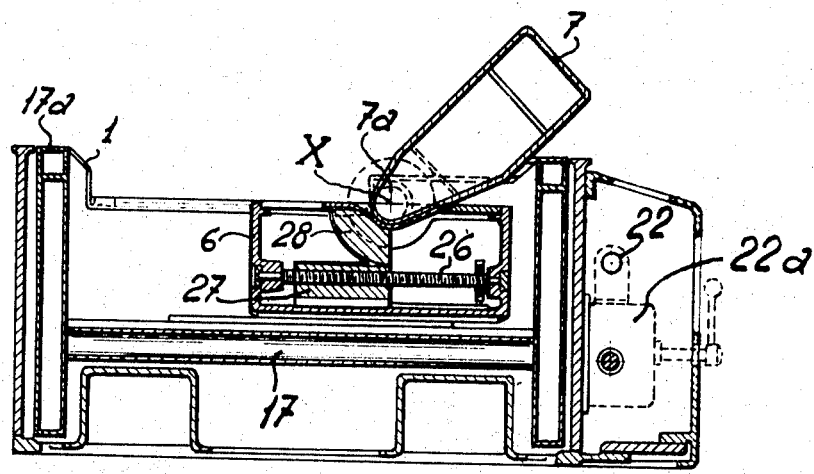
Figure 5:
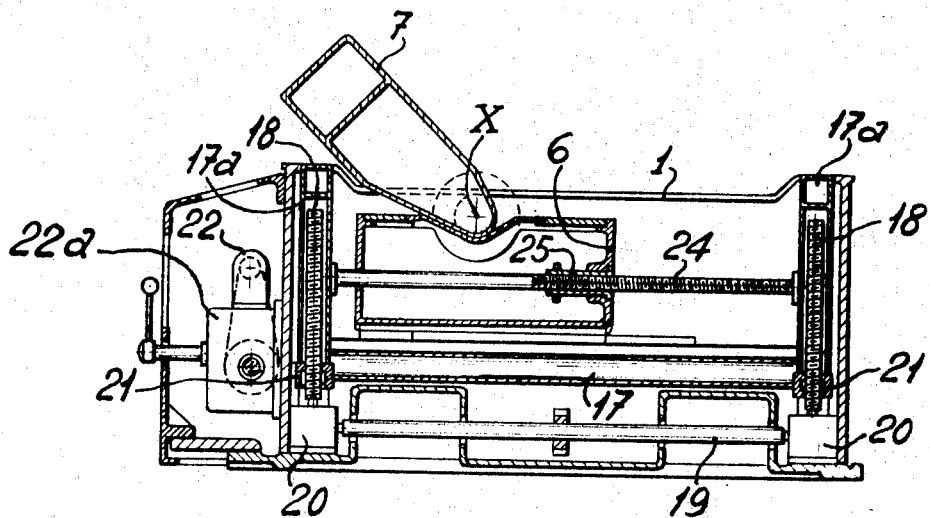
Figure 6A:
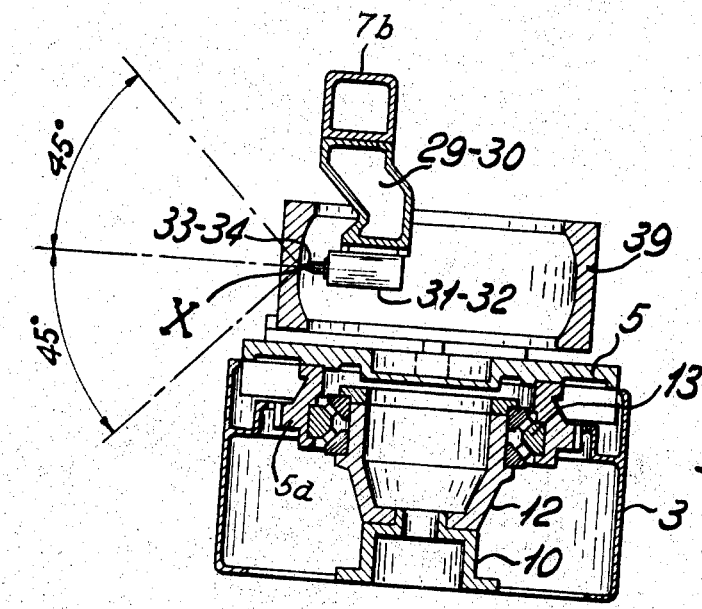
Figure 6B:
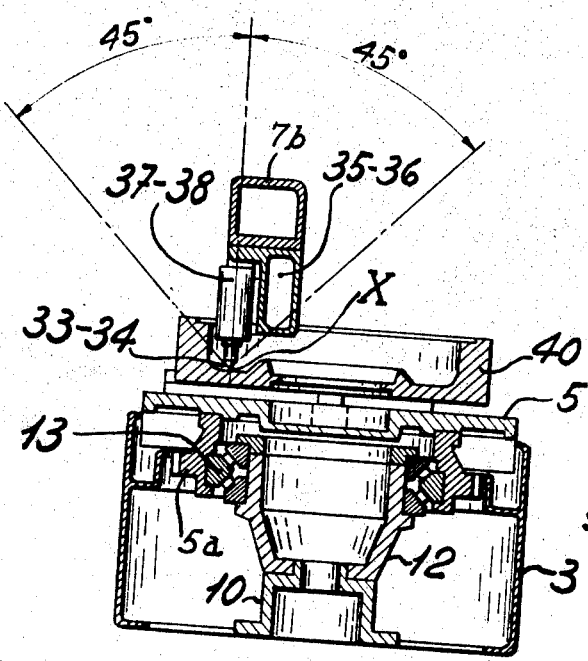

These and other features of the invention will be more clearly apparent from the following detailed description of a dual milling machine for working molds of pneumatic tires for vehicles, given by way of example and illustrated in the enclosed drawings, in which:

FIG. 1 is a front view of the machine;
FIG. 2 is a top view of the machine shown in FIG. 1;
FIG. 3 is a cross section taken along line 3—3 of FIG. 2;
FIG. 4 is a lateral vertical section taken along line 4—4 of FIG. 3;
FIG. 5 is an axial vertical section taken along line 5—5 of FIG. 3;
FIGS. 6a–6b illustrate the axial vertical section of a piece-carrying platform taken along line 6—6, with the spindle in horizontal and vertical positions, respectively, and
FIG. 7 is a plan view of the machine, carrying the horizontal axis spindles in working position in accordance with FIG. 6a.

With reference to FIGS. 1 and 2, the dual milling machine in accordance with the invention comprises a central frame 1, two lateral guards 2 and 3, within which rotatable platforms 4 and 5 are supported, and a central slide 6, horizontally slidable in the frame 1, on which ledger, or rocking cross-head, 7 is pivoted.

The platforms 4 and 5 are rotatable about their own vertical axes and are provided with jaws 8, preferably completed with self-centering means, or hand-operated chuck, to retain the piece being worked on the platform.

With reference to FIG. 3, it will be noted that central frame 1 of the machine extends laterally as far as the axes of platforms 4 and 5 with bases 9 and 10, carrying supports 11 and 12 for the platforms. While support 12 carries directly a bearing 13 for the rotatable support of platform 5, which therefore is at a predetermined level, support 11 supports the intermediate sleeve 14 by means of a screw 11a or the like, on whose sleeve the bearing 15 for the rotatable support of the platform 4 is applied. The intermediate sleeve 14 is provided on its outer surface with a spur gear 14a, which meshes with the pinion 16 of a motor speed reducer 16a. By rotating the pinion 16, the sleeve 14 is raised or lowered by means of screw connection 11a disposed between fixed support 11 and sleeve 14.

Both platforms 4 and 5 are controlled in rotation by an outer spur gear 4a, 5a, respectively, by means of a pinion or the like, associated with a motor speed reducer controlled by an oleodynamic group 22. A three-position speed gear 22a is inserted in the kinematic chain of the left hand platform in order to disconnect the transmission or to cause it to rotate in the same or in opposite sense with respect to the right hand platform. The spur gear 4a of the platform 4 is extended in an axial direction to permit transmission of the rotative movement to the different height levels which can be reached through the motion of the intermediate sleeve 14, as indicated above. The axial movement of the platform 4, obtained with means which permit very small displacements, even micrometric, is provided in order to set at the same level the surfaces to be worked, even if the thickness of the pieces disposed on the platforms varies within very wide tolerance limits, such as is the normally allowed practice in building up the outer walls of molds, chills and the like.

A slide 17 (see also FIGS. 4 and 5) is movable in a vertical direction in the central frame 1 and extends in a horizontal direction according to the size of the piece to be worked. The slide is constituted by a base, formed by welded square pipes, and rigidly connected to walls 17a, also formed by welded square pipes, at the end of which there are threaded shafts 18 controlled by a single shaft 19, driven by an appropriate motor, not illustrated, and through the motor speed reducers 20.

Threaded shafts 18 are in mesh with threaded sleeves 21 for lifting the slide 17, to which they are fixed, the assembly being slidable on guide rollers (not shown), the screw shafts being preferably of the type with recirculating balls.

A slide 6 slides in horizontal direction on the slide 17, by means of the guide rollers 23. This slide 6 is in the form of a box and comprises bearing supports 6a in which stub shafts 7a of a ledger 7 are pivoted.

The horizontally sliding slide 6 is displaced by means of a threaded shaft 24 and a threaded sleeve 25, rotatably attached to the slide 6, the shaft 24 being in a central position with respect to the slide. The threaded sleeve 25 is driven by a motor, preferably of the hydraulic type, not shown in the drawings.

A threaded shaft 26 driven by a motor (not shown) is also associated with the slide 6 and imparts horizontal motion to a slide 27, engaged with the sector-shaped extension 28 of the ledger 7, so that the horizontal movement of said slide 27 results in an angular movement of the ledger 7. The connection between these two parts is preferably carried out by means of crossed metal tapes, but can be effected by means of conventional toothing or the like, in particular for safety reasons, and with a clearance between the teeth.

The ledge 7 carries at its ends 7b two arms 29 and 30, on which are mounted spindles 31 and 32, each having a motor, at the ends of which tools or mills 33 and 34 for carrying out the work (see FIGS. 6a–6b) are provided.

Due to the disposition of the pivots 7a and the arms 7b of the ledger 7, as well as the shape and disposition of the arms 29 and 30 and of motor spindles 31 and 32, the tip of tools 33 and 34 assembled on the motor spindles is aligned with the axis X—X of oscillation of the ledger about the pivots 7a. In accordance with the invention, the arms 29, 30 mounted at the ends of the ledger 7 may serve to support motor spindles 31, 32, the axes of which are in the horizontal position when the ledger 7 is vertical, as illustrated at 29 and 30 in FIGS. 1, 2, 3, 7 and FIG. 6a. Alternately arms 35, 36 may serve to support vertical axes motor spindles 37, 38 (for a trued up position of the ledger 7) as respectively indicated at 35–36–37–38 in FIG. 6b. The angular movement of the ledger 7, with respect to the vertical direction, in the illustrated example is limited to 45° at one side and at the other and this, since the position of the axis of the motor spindle can be varied by 90°, results in a total range of 180° of the operative field. The two ranges of 90° of said operative field border on one another along a line inclined by 45° with respect to the vertical direction.

FIGS. 6a–6b illustrate two sections obtained along a vertical plane which axially cuts the platform 5. This platform carries in one instance a sector mold 39 for the formation of the tread of a pneumatic tire and in another instance a half of a mold for a pneumatic tire when the tread sidewall is to be worked.

In operation, it first being understood that the movements along the various axes can be obtained, as said above, with known means which fulfill a program, as for instance by punched tape, numerical control, magnetic tape, templates, feelers and the like, as well as with the various combinations of said means, other means are provided which, through an automatic control, for instance by tape, permit removal of the tool from a close contour recess and to bring it again in the same final position in another recess according to the axis whose movement depends on a template or the like through a position transducer, the working of a mold can be simultaneously effected on two equal or symmetrical halves of the same, or on a pair of molds or sectors.

The piece to be worked is secured on the platforms 4 and 5 by means of self-centering jaws 8. Then the separation plane of the mold halves, or the reference or symmetry plane, line, axis and the like of the pieces disposed on platform 4 is brought to the same level of the corresponding reference of the piece disposed on platform 5. This operation is carried out by rotating the intermediate sleeve 14, by means of the group 16–16a in either direction in order to lift or to lower the entire platform 4 and the related bearing 15. The operation is followed by the horizontal movement of the slide 6 by rotation of the threaded sleeve on the screw 24 and then by the vertical movement of the slide 17 by means of the screws 18, until the tip of the tool is brought in operative position (see FIGS. 4, 5, 7).

The combined movements of the various parts, namely, the rotation of the platforms about their vertical axes, in the same or in opposite sense, the horizontal and vertical displacement of the slide 6, transmitted in turn to the ledger 7, and the swinging of said ledger about axis X—X (passing through the tips of the mill 33–34) permits working on the mold recesses along inner surfaces of revolution, in planes perpendicular or parallel to the axis of said surfaces.

In accordance with the invention, depending upon the type of process and the shape of the piece to be worked, two slidable platforms, aligned with each other and having the same or an opposite transversal movement, can be substituted for the rotatable platforms. It is also possible to use only one of the motor spindles and to eliminate one of the two working places.

Of course, the structure of the various parts of the machine is designed for the stresses to which these are subjected. However, aid is given to the structure of the slide 17, by providing square pipes, disposed side by side and welded, in order to ensure sufficient rigidity of the assembly, and to the particular structure of the box-shaped ledger, intended to confer a certain lightness to the swinging unit. These are typical features of the machine according to the invention, in relation to the movements it has to carry out and to the size of the pieces to be worked.

It is understood that many alternative embodiments of the above described subject matter may be carried out, in particular as regards the construction standpoint, without falling out of the field of the present invention.

I claim:

1. A milling machine for working upon inner surfaces of work pieces, comprising: at least one work piece carrying platform; a frame supporting said platform; a first vertically movable slide slidably mounted on said frame; a second horizontally movable slide supported by said first slide; horizontal axis supports mounted on said second slide; a ledger mounted on said horizontal axis supports, said ledger being rotatable about the horizontal axis passing through said supports; and tools for working upon said work pieces mounted on respective ends of said ledger, the working tips of said tools being aligned with said horizontal axis.

2. A milling machine as defined in claim 1, wherein said machine is movable in four directions, a first movement being a swinging movement about an axis passing through said working tips of said tools.

3. A milling machine as defined in claim 1, wherein said platform includes means for fastening said work piece and means for aligning said work piece with respect to a further work piece.

4. A milling machine as defined in claim 1, comprising a pair of platforms rotatable about a vertical axis and symmetrical with respect to said frame, said platforms being movable with respect to each other.

5. A milling machine as defined in claim 1, further comprising spindle-supporting arms mounted at the ends of said ledger, said tools being mounted on said arms such that the tips of said tools are maintained in alignment with said horizontal axis of said ledger.

6. A milling machine as defined in claim 4, further comprising means for moving one of said pair of platforms along said vertical axis to compensate for variations in the dimensions of workpieces mounted on said pair of platforms.

7. A milling machine as defined in claim 1, wherein said first slide is provided with means for guiding said second slide during sliding movement of said second slide.

8. A milling machine as defined in claim 1, further comprising: a third horizontally movable slide slideably mounted on said second slide; screw means controlling movement of said third slide connected thereto; and a circular sector connected to said third slide and to said ledger for controlling rotational movement of said ledger about said horizontal axis.

* * * * *